United States Patent
De Bondt et al.

(10) Patent No.: US 10,177,678 B2
(45) Date of Patent: Jan. 8, 2019

(54) BUFFERING CAPACITOR FOR DIODE BRIDGE RECTIFIER WITH CONTROLLED DECHARGING CURRENT

(71) Applicant: PHILIPS LIGHTING HOLDING B.V., Eindhoven (NL)

(72) Inventors: Guy Louis Paul De Bondt, Eindhoven (NL); Georg Sauerländer, Eindhoven (NL); Christian Hattrup, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,138

(22) PCT Filed: Jan. 8, 2015

(86) PCT No.: PCT/EP2015/050263
§ 371 (c)(1),
(2) Date: Jul. 7, 2016

(87) PCT Pub. No.: WO2015/104337
PCT Pub. Date: Jul. 16, 2015

(65) Prior Publication Data
US 2016/0329826 A1    Nov. 10, 2016

(30) Foreign Application Priority Data
Jan. 13, 2014    (EP) .................................... 14150883

(51) Int. Cl.
*H02M 1/15*    (2006.01)
*H02M 7/04*    (2006.01)
*H02M 1/42*    (2007.01)

(52) U.S. Cl.
CPC ........... *H02M 7/04* (2013.01); *H02M 1/4266* (2013.01); *Y02B 70/123* (2013.01)

(58) Field of Classification Search
CPC ............ H02M 1/14; H02M 1/15; H02M 7/00; H02M 7/04
(Continued)

(56) References Cited

U.S. PATENT DOCUMENTS

| 4,449,177 A | * | 5/1984 | Kozai et al. | ........... H02H 3/023 363/126 |
| 5,387,847 A | * | 2/1995 | Wood | ..................... H05B 41/28 315/187 |

(Continued)

FOREIGN PATENT DOCUMENTS

| CN | 102244955 A | 11/2011 |
| CN | 102652464 A | 8/2012 |

(Continued)

OTHER PUBLICATIONS

. Wantanabe, et al., "Vector Controlled Induction Motor Drives with Electrical Double Layer Capacitor", Power lectronics Specialists Conference, 2004, Pesc 04; 2004 IEEE 35th Annual Aachen, Germany, Jun. 20-25, 2004, iscataway, Nj, US, IEEE, US, Jun. 20, 2004, pp. 1359-1364.

*Primary Examiner* — Jeffrey Sterrett
(74) *Attorney, Agent, or Firm* — Akarsh P. Belagodu

(57) ABSTRACT

Arrangements (1) for buffering energy comprise buffer capacitor circuits (10) with one or more buffer capacitors (11), first circuits (20) for guiding charging currents for charging the buffer capacitor circuits (10), and second circuits (30) with current source circuits (31-34) for defining amplitudes of de-charging currents for de-charging the buffer capacitor circuits (10), to better control the de-charging of the buffer capacitor circuits (10). The second circuits (30) may further comprise trigger circuits (51-53) for bringing the current source circuits (31-34) into activated modes, and latch circuits (61-63) for latching the current source circuits (31-34). The arrangements (1) may further comprise (Continued)

smoothing capacitor circuits (40) with one or more smoothing capacitors (41). The buffer capacitor circuits (10) may be coupled serially to the first circuits (20), and the first and second circuits (20, 30) may be coupled in parallel to each other.

15 Claims, 3 Drawing Sheets

(58) Field of Classification Search
USPC .............................................. 363/44, 45, 46
See application file for complete search history.

(56) References Cited

U.S. PATENT DOCUMENTS

| | | | | |
|---|---|---|---|---|
| 5,587,894 | A * | 12/1996 | Naruo ................ | H02M 1/4208 363/44 |
| 5,714,846 | A * | 2/1998 | Rasch et al. ........ | H02M 1/4266 315/205 |
| 5,798,914 | A * | 8/1998 | Wuidart et al. ..... | H02M 1/4208 363/39 |
| 5,825,639 | A * | 10/1998 | Wagoner ............. | H02M 1/14 363/39 |
| 5,859,524 | A * | 1/1999 | Ettes .................... | H02J 7/0004 320/114 |
| 6,137,701 | A * | 10/2000 | Teissier et al. ..... | H02M 1/4208 363/19 |
| 6,414,859 | B1 * | 7/2002 | Zhang ................. | H02M 1/4266 363/44 |
| 6,438,001 | B1 * | 8/2002 | Duerbaum .......... | H02M 1/4208 363/126 |
| 7,760,524 | B2 * | 7/2010 | Matthews ............ | H02M 1/10 363/45 |
| 9,048,746 | B2 * | 6/2015 | Luthi et al. ......... | H02M 1/36 |
| 2002/0159276 | A1 * | 10/2002 | Deboy ................ | H02M 3/33507 363/20 |
| 2004/0183477 | A1 | 9/2004 | Newman, Jr. et al. | |
| 2009/0021969 | A1 * | 1/2009 | Butler et al. ....... | H02M 7/2176 363/126 |
| 2013/0043910 | A1 | 2/2013 | Deppe et al. | |
| 2013/0049618 | A1 | 2/2013 | Radermacher | |
| 2016/0329826 | A1 * | 11/2016 | De Bondt et al. .. | H02M 1/4266 |
| 2017/0279372 | A1 * | 9/2017 | Sakakibara ......... | H02M 5/458 |
| 2018/0131275 | A1 * | 5/2018 | Guan ................... | H02M 3/156 |

FOREIGN PATENT DOCUMENTS

| | | |
|---|---|---|
| FR | 2742010 A1 | 6/1997 |
| JP | H1141930 A | 2/1999 |
| NO | N02012059853 A1 | 5/2012 |
| SU | 1781788 A1 | 12/1992 |
| WO | 2011027816 A1 | 3/2011 |

* cited by examiner

BUFFERING CAPACITOR FOR DIODE BRIDGE RECTIFIER WITH CONTROLLED DECHARGING CURRENT

CROSS-REFERENCE TO PRIOR APPLICATIONS

This application is the U.S. National Phase application under 35 U.S.C. § 371 of International Application No. PCT/EP2015/050263, filed on Jan. 8, 2015, which claims the benefit of European Patent Application No. 14150883.8, filed on Jan. 13, 2014. These applications are hereby incorporated by reference herein.

FIELD OF THE INVENTION

The invention relates to an arrangement for buffering energy. The invention further relates to an apparatus comprising the arrangement and further comprising a rectifier circuit for supplying first power to the arrangement. The invention yet further relates to a device comprising the arrangement and further comprising a load for receiving second power from the arrangement.

Examples of such an arrangement are combinations of a valley-fill-in circuit and a capacitor circuit. Examples of such a device are loads such as lamps.

BACKGROUND OF THE INVENTION

FR 2 742 010 discloses a combination of a valley-fill-in circuit and a capacitor circuit. This valley-fill-in circuit is based on a thyristor.

US2013/0049618 discloses an adaptive circuit for driving a load. The adaptive circuit comprises a buffer capacitor circuit with two buffer capacitors in series. A first circuit guides a charging current for the buffer capacitors and a second circuit defines the de-charging current of the buffer capacitors. A smoothing capacitor is provided in series with the buffer capacitor.

SUMMARY OF THE INVENTION

It is an object of the invention to provide an improved arrangement. Further objects of the invention are to provide an apparatus and a device.

According to a first aspect, an arrangement is provided for buffering energy, the arrangement comprising
- a buffer capacitor circuit comprising one or more buffer capacitors,
- a smoothing capacitor circuit comprising one or more smoothing capacitors,
- a first circuit for guiding a charging current, the buffer capacitor circuit being arranged to be charged via the charging current, and
- a second circuit comprising a current source circuit for defining an amplitude of a de-charging current, the buffer capacitor circuit being arranged to be de-charged via the de-charging current, wherein
the smoothing capacitor circuit is in parallel with the buffer capacitor circuit, and
a capacitance of the buffer capacitor circuit being larger than a capacitance of the smoothing capacitor circuit.

A smoothing capacitor circuit comprises one or more smoothing capacitors in a serial connection or two smoothing capacitors in a parallel connection or three or more smoothing capacitors in whatever serial and/or parallel connection. A capacitance of the buffer capacitor circuit should be larger than a capacitance of the smoothing capacitor circuit, preferably at least twice as large, more preferably at least five times as large etc. A buffer capacitor circuit comprises one buffer capacitor or two buffer capacitors in a serial connection or two buffer capacitors in a parallel connection or three or more buffer capacitors in whatever serial and/or parallel connection. Via a charging current flowing through a first circuit, the buffer capacitor circuit is charged. Via a de-charging current flowing through a second circuit, the buffer capacitor circuit is de-charged. A current source circuit in the second circuit defines an amplitude of this de-charging current. As a result, compared to a use of a thyristor as shown in FR 2 742 010, an amplitude of a de-charging current is better defined, and the de-charging of the buffer capacitor circuit can be better controlled. This is a great advantage.

An embodiment of the arrangement is defined by the second circuit further comprising a trigger circuit for bringing the current source circuit into an activated mode, the current source circuit being arranged to define the amplitude of the de-charging current in the activated mode. A trigger circuit comprises for example a voltage detector for detecting a difference amplitude between an amplitude of a voltage present across the buffer capacitor circuit and an amplitude of an input voltage as for example supplied via a rectifier circuit by a supply. Once this difference amplitude has reached and/or exceeded a threshold amplitude, the current source circuit is brought into the activated mode for defining an amplitude of the de-charging current. Other kinds of trigger circuits and other kinds of signals are not to be excluded.

An embodiment of the arrangement is defined by the second circuit further comprising a latch circuit for latching the current source circuit. A latch circuit may stabilize an operation of the second circuit.

An embodiment of the arrangement is defined by the second circuit being arranged to guide a leakage current in a de-activated mode of the current source circuit, an amplitude of the leakage current being at least ten times smaller than the amplitude of the de-charging current. In a de-activated mode of the current source circuit, a leakage current may flow through the second circuit. An amplitude of the leakage current should be at least ten times smaller than the amplitude of the de-charging current, preferably at least fifty times smaller, more preferably at least a hundred times smaller etc.

In other words, during the de-activated mode, when the current source circuit is not guiding the de-charging current, only a much smaller leakage current may flow through the second circuit in an opposite direction. Similarly, when the first circuit is not guiding the charging current, only a much smaller further leakage current may flow through the first circuit in an opposite direction. An amplitude of the further leakage current should be at least ten times smaller than the amplitude of the charging current, preferably at least fifty times smaller, more preferably at least a hundred times smaller etc.

Alternatively, the smoothing capacitor circuit may form part of a load to be coupled to the arrangement.

An embodiment of the arrangement is defined by the buffer capacitor circuit being coupled serially to the first circuit, and the second circuit being coupled in parallel to the first circuit. A serial connection of the buffer capacitor circuit and the first circuit and a parallel connection of the first and second circuits allow the first and second circuits to be realized through simple and low cost and robust embodiments.

An embodiment of the arrangement is defined by the second circuit comprising first and second terminals coupled to first and second terminals of the first circuit, the second circuit comprising a first transistor, one or more of first and second zener diodes and one or more of first, second and third resistors. As an example only, a first main electrode of the first transistor may be coupled via the first resistor to the first terminal of the second circuit, a serial connection of the second and third resistors may be coupled to the first and second terminals of the second circuit, an interconnection between the second and third resistors may be coupled via the second zener diode to a control electrode of the first transistor, and the control electrode of the first transistor may be coupled via the first zener diode to the first terminal of the second circuit. The current source circuit may be based on a first transistor and a first resistor and a first zener diode. The trigger circuit may be based on second and third resistors and a second zener diode. A first zener diode in combination with the first transistor and the first resistor may define the amplitude of the de-charging current. A second zener diode in combination with the second and third resistors may define the threshold amplitude.

A zener diode may be a real zener diode or may comprise one or more normal diodes or may be realized via a transistor circuit etc.

An embodiment of the arrangement is defined by the second circuit further comprising a second transistor and one or more of fourth and fifth resistors. As an example only, a control electrode of the second transistor may be coupled to a second main electrode of the first transistor and via the fourth resistor to the second terminal of the second circuit, a first main electrode of the second transistor may be coupled via the fifth resistor to the second terminal of the second circuit, and a second main electrode of the second transistor may be coupled to the control electrode of the first transistor. The latch circuit may be based on a second transistor and fourth and fifth resistors.

An embodiment of the arrangement is defined by the second circuit further comprising a capacitance. As an example only, the capacitance may be coupled to the first terminal of the second circuit and to the control electrode of the first transistor. A capacitance may smooth an operation of the current source circuit.

An embodiment of the arrangement is defined by the first circuit comprising a diode. The first circuit in the form of a diode will form a relatively low impedance for the charging current and will form a relatively high impedance for the de-charging current.

According to a second aspect, an apparatus is provided comprising the arrangement as defined above and further comprising a rectifier circuit for supplying first power to the arrangement. First power from the rectifier circuit may be used for charging the buffer capacitor circuit and the smoothing capacitor circuit. The rectifier circuit may supply further power directly to a load coupled to the arrangement.

An embodiment of the apparatus is defined by the rectifier circuit comprising inputs for receiving an alternating-current voltage from a supply and outputs for providing a direct-current voltage having a fluctuating amplitude to the arrangement. Especially in case a direct-current voltage having a fluctuating amplitude is supplied to a load, an arrangement may be useful for valley-fill-in purposes.

An embodiment of the apparatus is defined by the rectifier circuit being arranged to guide the charging current and to block the de-charging current.

An embodiment of the apparatus is defined by the rectifier circuit comprising four diodes in a diode bridge.

According to a third aspect, a device is provided comprising the arrangement as defined above and further comprising a load for receiving second power from the arrangement. Second power may be provided by the buffer capacitor circuit and the smoothing capacitor circuit. The load may receive further power directly from a supply possibly via a rectifier circuit.

A basic idea is that a buffer capacitor circuit is to be charged via a charging current and is to be de-charged via a de-charging current having a well-defined amplitude.

A problem to provide an improved arrangement has been solved. With the improved arrangement, the de-charging of a buffer capacitor circuit can be better controlled. A current source circuit allows, for example compared to a thyristor, an amplitude of a de-charging current as well as its timing to be more precisely defined. A further advantage is that a power factor is improved.

These and other aspects of the invention will be apparent from and elucidated with reference to the embodiments described hereinafter.

DETAILED DESCRIPTION OF EMBODIMENTS

Figure 1:
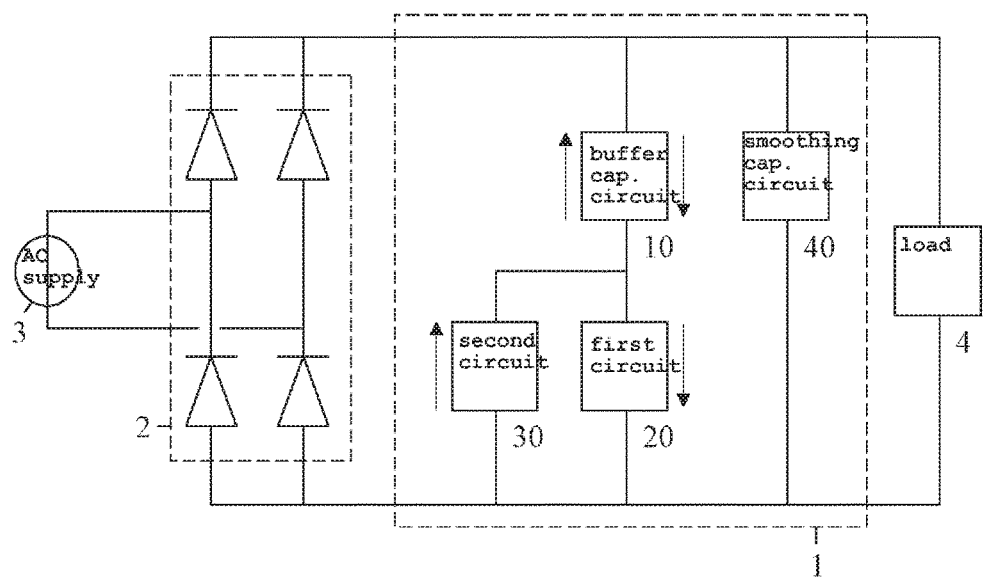
FIG. 1 shows an embodiment of a system.

In the FIG. 1, a system is shown. The system comprises a supply 3 for providing an alternating-current voltage via a rectifier circuit 2 to a parallel connection of an arrangement 1 and a load 4. The rectifier circuit 2 for example comprises four diodes in a rectifier bridge and converts the alternating-current voltage into a direct-current voltage having a fluctuating amplitude. The load 4 for example comprises a consumer product including a switched mode power supply such as a lamp including a driver. Other kinds of rectifier circuits 2 and other kinds of loads 4 are not to be excluded.

Figure 2:
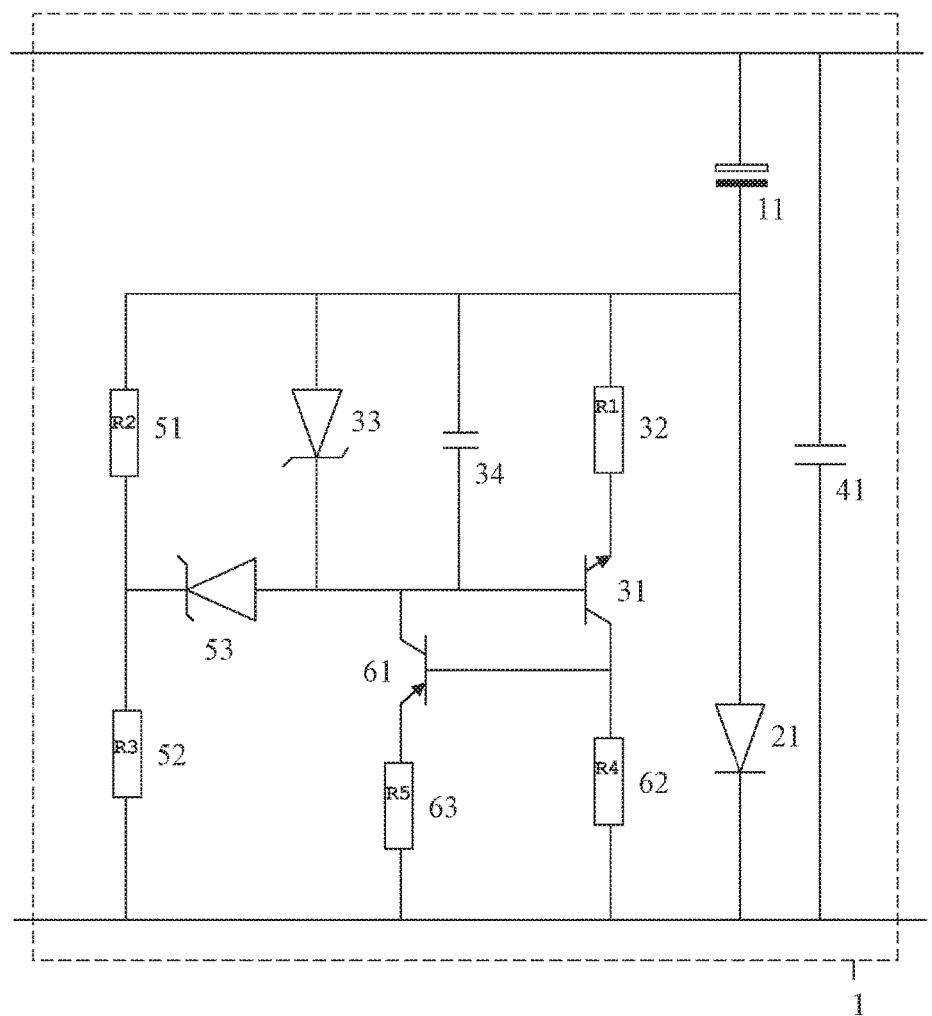
FIG. 2 shows an embodiment of an arrangement.

The arrangement 1 is arranged to buffer energy and comprises a buffer capacitor circuit 10 comprising one or more buffer capacitors 11 shown in the FIG. 2. The arrangement 1 further comprises a first circuit 20 for guiding a charging current indicated by the downward arrows. The buffer capacitor circuit 10 is arranged to be charged via the charging current, with a loop being realized via the rectifier circuit 2 in combination with the supply 3. The arrangement 1 further comprises a second circuit 30 with a current source circuit 31-34 shown in the FIG. 2 for defining an amplitude of a de-charging current indicated by the upward arrows. The buffer capacitor circuit 10 is arranged to be de-charged via the de-charging current, with a loop being realized via the load 4 and/or via a smoothing capacitor circuit 40 comprising one or more smoothing capacitors 41 shown in the FIG. 2. Preferably, a capacitance of the buffer capacitor circuit 10 will be larger than a capacitance of the smoothing capacitor circuit 40.

The second circuit 30 may further comprise a trigger circuit 51-53 shown in the FIG. 2 for bringing the current source circuit 31-34 into an activated mode. The current source circuit 31-34 is arranged to define the amplitude of the de-charging current in the activated mode. The second circuit 30 is arranged to guide a leakage current in a de-activated mode of the current source circuit 31-34. Usually, an amplitude of the leakage current will be at least ten times smaller than the amplitude of the de-charging current. The second circuit 30 may further comprise a latch circuit 61-63 shown in the FIG. 2 for latching the current source circuit 31-34.

Preferably, the buffer capacitor circuit 10 is coupled serially to the first circuit 20, and the second circuit 30 is coupled in parallel to the first circuit 20.

In the FIG. 2, an embodiment of an arrangement 1 is shown. The buffer capacitor circuit 10 shown in the FIG. 1 here comprises one buffer capacitor 11 coupled to a first (upper) terminal of the arrangement 1. The first circuit 20 shown in the FIG. 1 here comprises a diode 21 for guiding the charging current. An anode of the diode 21 is coupled to the buffer capacitor 11 and a cathode of the diode 21 is coupled to a second (lower) terminal of the arrangement 1. The second circuit 30 shown in the FIG. 1 comprises the current source circuit 31-34 for defining the amplitude of the de-charging current, and may further comprise the trigger circuit 51-53 for bringing the current source circuit 31-34 into the activated mode, and may further comprise the latch circuit 61-63 for latching the current source circuit 31-34.

The second circuit 30 comprises first and second terminals coupled to the anode and the cathode of the diode 21. The current source circuit 31-34 comprises a first transistor 31, a first zener diode 33, a first resistor 32 and a capacitance 34. The trigger circuit 51-53 comprises second and third resistors 51, 52 and a second zener diode 53. The latch circuit 61-63 comprises a second transistor 61 and fourth and fifth resistors 62, 63. A first main electrode of the first transistor 31 is coupled via the first resistor 32 to the first terminal of the second circuit 30. A serial connection of the second and third resistors 51, 52 is coupled to the first and second terminals of the second circuit 30. An interconnection between the second and third resistors 51, 52 is coupled via the second zener diode 53 to a control electrode of the first transistor 31. The control electrode of the first transistor 31 is coupled via a parallel connection of the first zener diode 33 and the capacitance 34 to the first terminal of the second circuit 30. A control electrode of the second transistor 61 is coupled to a second main electrode of the first transistor 31 and via the fourth resistor 62 to the second terminal of the second circuit 30. A first main electrode of the second transistor 61 is coupled via the fifth resistor 63 to the second terminal of the second circuit 30. A second main electrode of the second transistor 61 is coupled to the control electrode of the first transistor 31.

The arrangement 1 shown in the FIG. 2 functions as follows. The rectifier circuit 2 converts the alternating-current voltage from the supply 3 into a direct-current voltage and provides this direct-current voltage to a parallel connection of the arrangement 1 and the load 4. This direct-current voltage is a rectified sine wave voltage. Starting from a zero-crossing to a peak of the rectified sine wave voltage, the buffer capacitor 11 is substantially charged up to a peak value of the direct-current voltage. The charging current flows through the buffer capacitor 11 and the diode 21. Owing to the fact that the diode 21 is in the conducting mode, across the diode 21 a voltage is present having an amplitude of for example 0.6 Volt or 0.7 Volt. The same voltage is present across the second circuit 30, and as a result the current source circuit 31-34 and the trigger circuit 51-53 cannot react.

Going down from the peak of the rectified sine wave, the buffer capacitor 11 will firstly (try to) keep its voltage amplitude. As a first result, the interconnection between the buffer capacitor 11 and the diode 21 will get, in view of the second (lower) terminal of the arrangement 1, a negative voltage potential. As a second result, the diode 21 will get a non-conducting mode. As a third result, an amplitude of a voltage present from the second terminal of the second circuit 30 (or the cathode of the diode 21) to the first terminal of the second circuit 30 (or the anode of the diode 21) will get larger and larger. As soon as this amplitude has reached a sufficient size, defined by the second and third resistors 51, 52 and the second zener diode 53, the trigger circuit 51-53 will activate the current source circuit 31-34, and a de-charging current defined by the first zener diode 33 and the first transistor 31 and the first resistor 32 will start to flow through the second circuit 30 and through the buffer capacitor 11 and through the smoothing capacitor 41 (for charging it) and/or through the load 4 (for feeding it). Although the rectified sine wave voltage is going down from the peak to the zero-crossing, from this moment on the voltage across the load 4 will go up, and the rectifier circuit 2 will go into a non-conducting mode. This all until the zero-crossing in the rectified sine wave voltage is reached, then the cycle will start again.

The latch circuit 61-63 may be introduced for stabilizing the current source circuit 31-34 and for preventing that the current source circuit 31-34 is switched off and on unnecessarily.

Figure 3:
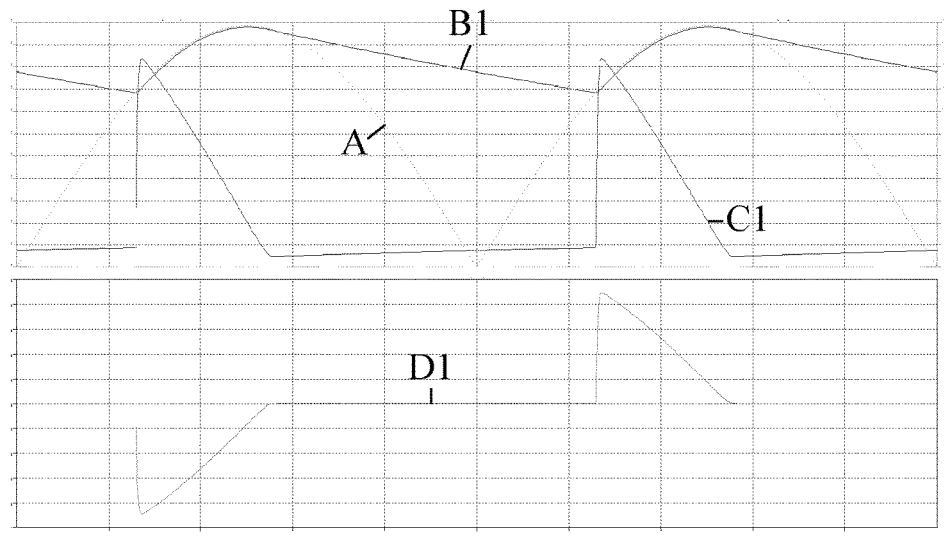
FIG. 3 shows prior art waveforms.

In the FIG. 3, prior art waveforms are shown, for a situation without valley-fill-in, wherein A is the rectified sine wave, B1 is the voltage across the load 4, C1 is the current flowing through the buffer capacitor 11, and D1 is the current flowing through the supply 3.

Figure 4:
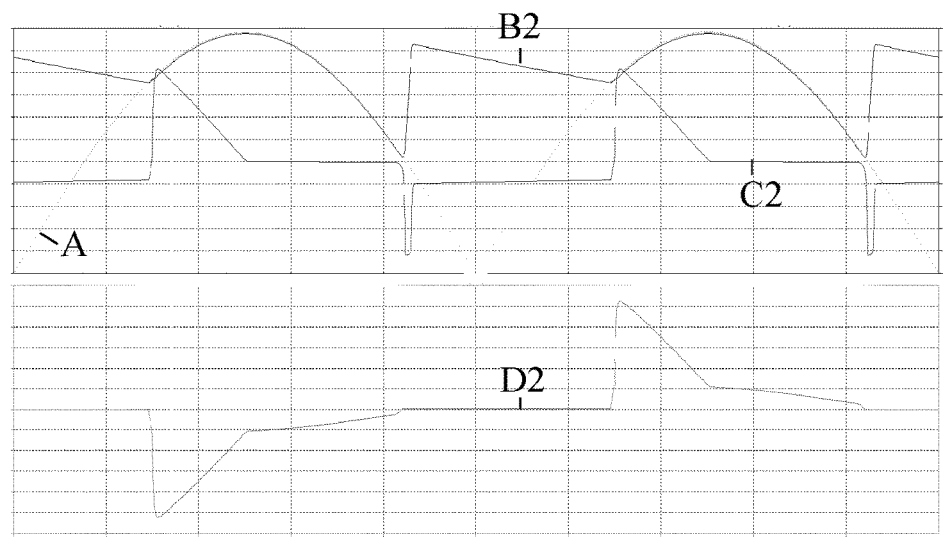
FIG. 4 shows improved waveforms.

In the FIG. 4, improved waveforms are shown, for a situation comprising the arrangement 1, wherein A is the rectified sine wave, B2 is the voltage across the load 4, C2 is the current flowing through the buffer capacitor 11, and D2 is the current flowing through the supply 3. Clearly, when comparing D1 and D2, a conduction angle (a time that the current flowing through outputs of the supply 3 is unequal to zero) has increased, which means that a power factor has increased, by having added the arrangement 1.

Compared to FR 2 742 010 disclosing a combination of a valley-fill-in circuit and a capacitor circuit, which valley-fill-in circuit is based on a thyristor, by having introduced the arrangement 1, an amplitude of the de-charging current and its timing can be better defined, and the de-charging of the buffer capacitor circuit 10 can be better controlled, which is a great improvement.

Instead of a rectified sine wave voltage, other kinds of voltages having fluctuating amplitudes could be possible too. Many other kinds of embodiments for the current source circuit, for the trigger circuit and for the latch circuit will be possible too. First and second elements can be coupled indirectly via a third element and can be coupled directly without the third element being in between.

Summarizing, arrangements 1 for buffering energy comprise buffer capacitor circuits 10 with one or more buffer capacitors 11, first circuits 20 for guiding charging currents for charging the buffer capacitor circuits 10, and second circuits 30 with current source circuits 31-34 for defining amplitudes of de-charging currents for de-charging the buffer capacitor circuits 10, to better control the de-charging of the buffer capacitor circuits 10. The second circuits 30 may further comprise trigger circuits 51-53 for bringing the current source circuits 31-34 into activated modes, and latch circuits 61-63 for latching the current source circuits 31-34. The arrangements 1 may further comprise smoothing capacitor circuits 40 with one or more smoothing capacitors 41. The buffer capacitor circuits 10 may be coupled serially to the first circuits 20, and the first and second circuits 20, 30 may be coupled in parallel to each other.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An arrangement for buffering energy, the arrangement comprising
    a buffer capacitor circuit comprising one or more buffer capacitors,
    a smoothing capacitor circuit comprising one or more smoothing capacitors,
    a first circuit for guiding a charging current, the buffer capacitor circuit being arranged to be charged via the charging current, and
    a second circuit comprising a current source circuit for defining an amplitude of a de-charging current, the buffer capacitor circuit being arranged to be de-charged via the de-charging current,
    wherein,
    the buffer capacitor circuit is coupled serially to the first circuit, and the second circuit is coupled in parallel to the first circuit,
    the smoothing capacitor circuit is coupled in parallel to a combination of the buffer capacitor circuit and the first circuit, and
    a capacitance of the buffer capacitor circuit being larger than a capacitance of the smoothing capacitor circuit.

2. The arrangement as defined in claim 1, the second circuit further comprising a trigger circuit for bringing the current source circuit into an activated mode, the current source circuit being arranged to define the amplitude of the de-charging current in the activated mode.

3. The arrangement as defined in claim 2, the second circuit further comprising a latch circuit for latching the current source circuit.

4. The arrangement as defined in claim 2, the second circuit being arranged to guide a leakage current in a de-activated mode of the current source circuit, an amplitude of the leakage current being at least ten times smaller than the amplitude of the de-charging current.

5. The arrangement as defined in claim 1, the smoothing capacitor circuit being configured to be coupled in parallel to a load, and the buffer capacitor circuit being arranged to be de-charged via the de-charging current through a loop comprising the smoothing capacitor circuit and/or the load.

6. The arrangement as defined in claim 1, the second circuit comprising first and second terminals coupled to first and second terminals of the first circuit, the second circuit comprising a first transistor, one or more zener diodes and one or more resistors.

7. The arrangement as defined in claim 6, the second circuit further comprising a second transistor and one or more further resistors.

8. The arrangement as defined in claim 6, the second circuit further comprising a capacitance.

9. The arrangement as defined in claim 1, the first circuit comprising a diode.

10. An apparatus comprising the arrangement as defined in claim 1 and further comprising a rectifier circuit for supplying first power to the arrangement.

11. The apparatus as defined in claim 10, the rectifier circuit comprising inputs for receiving an alternating-current voltage from a supply and outputs for providing a direct-current voltage having a fluctuating amplitude to the arrangement.

12. The apparatus as defined in claim 10, the rectifier circuit being arranged to guide the charging current and to block the de-charging current.

13. The apparatus as defined in claim 10, the rectifier circuit comprising four diodes in a diode bridge.

14. A device comprising the arrangement as defined in claim 1 and further comprising a load for receiving second power from the arrangement.

15. The device as defined in claim 14, the smoothing capacitor circuit being coupled in parallel to the load, and the buffer capacitor circuit being arranged to be de-charged via the de-charging current through a loop comprising the smoothing capacitor circuit and/or the load.

* * * * *